Sept. 24, 1968  KEIZO SHIMANO ET AL  3,402,942
DEVICE FOR TENSIONING THE DRIVING CHAIN IN A BICYCLE EQUIPPED
WITH COASTER BRAKE AND EXPOSED SPEED CHANGE GEAR
Filed June 12, 1967  2 Sheets-Sheet 1
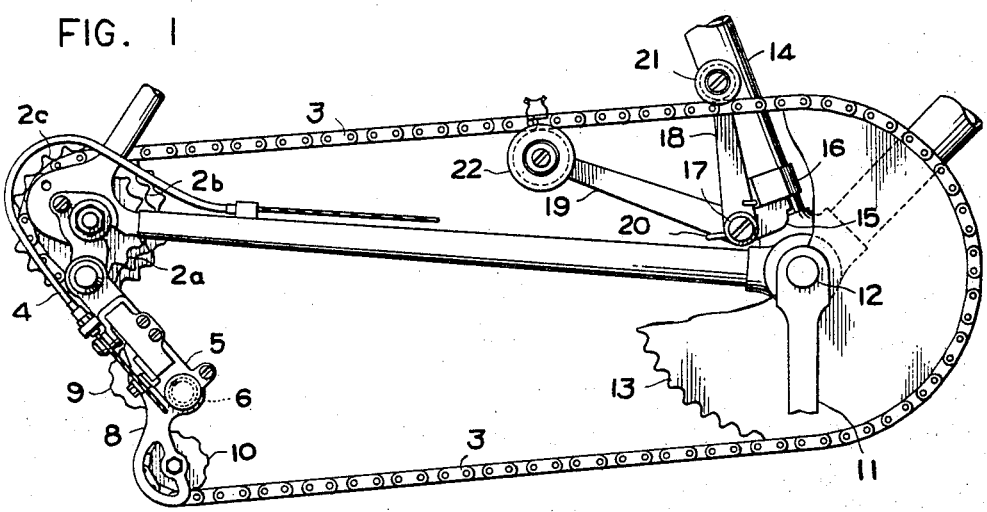
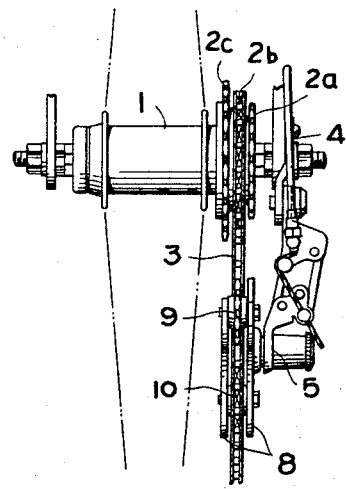
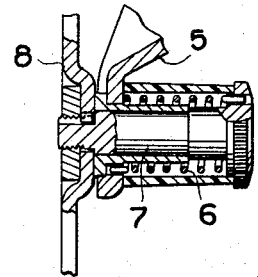
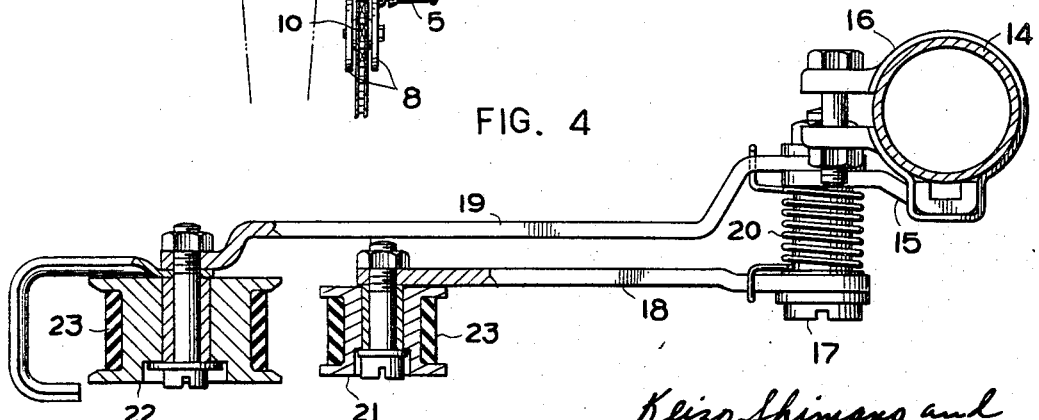

Sept. 24, 1968  KEIZO SHIMANO ETAL  3,402,942
DEVICE FOR TENSIONING THE DRIVING CHAIN IN A BICYCLE EQUIPPED
WITH COASTER BRAKE AND EXPOSED SPEED CHANGE GEAR
Filed June 12, 1967  2 Sheets-Sheet 2

United States Patent Office 3,402,942
Patented Sept. 24, 1968

3,402,942
DEVICE FOR TENSIONING THE DRIVING CHAIN IN A BICYCLE EQUIPPED WITH COASTER BRAKE AND EXPOSED SPEED CHANGE GEAR
Keizo Shimano and Masashi Nagano, Sakai, Japan, assignors to Shimano Kogyo Kabushiki Kaisha, Sakai, Japan
Filed June 12, 1967, Ser. No. 645,417
Claims priority, application Japan, June 17, 1966, 41/39,470
4 Claims. (Cl. 280—236)

ABSTRACT OF THE DISCLOSURE

A device for tensioning the upper run of the driving chain of a bicycle equipped with built-in coaster brake adapted to be applied by rotating the front sprocket in the reverse direction, and equipped with an exposed speed change gear, in which the upper run of the driving chain would be slackened when it runs in the reverse direction upon applying the coaster brake, if there were not provided any chain tensioning device.

---

The principal object of the present invention is to provide in such bicycle an improved chain tensioning device which is simple in construction, economical to manufacture, can readily be assembled, and is reliable in operation.

Other objects of the present invention will become apparent from the following detailed description taken in conjunction with the accompanying drawings, wherein:

FIGURE 1 is a side view of the chain tensioning device according to the present invention, shown in the position when the driving chain is running in the normal direction;

FIGURE 2 is a rear view of the rear hub of a bicycle and an exposed speed change gear assembly mounted thereon;

FIGURE 3 is an enlarged sectional view of a portion of said speed change gear;

FIGURE 4 is a plan view partly in section of depressing and supporting arms forming the chain tensioning device;

Figure 6:
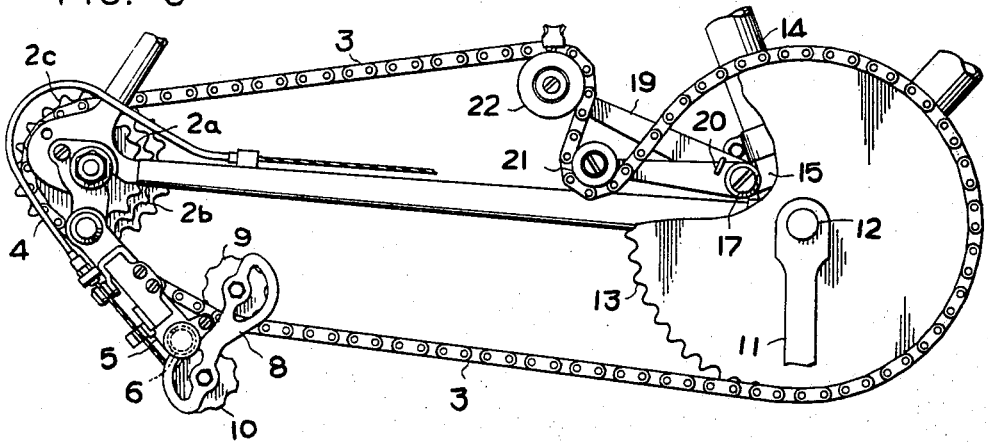
FIGURE 6 is a side view similar to FIGURE 1, but showing the parts in the position when the front sprocket is rotated in the reverse direction to apply the coaster brake.
Figure 5:
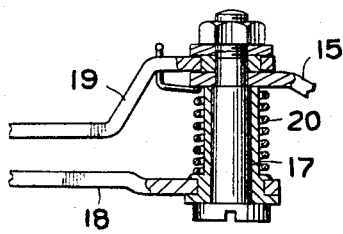
FIGURE 5 is a detail showing in section of the pivotal mounting of said depressing and supporting arms.

As usual, the coaster brake is built-in a rear hub 1 and, in the embodiment of the present invention shown in FIGS. 1 and 2, the speed change gear comprises a plurality of sprocket wheels 2a, 2b and 2c of different number of teeth arranged on the righthand end portion of the rear hub 1, the smallest sprocket wheel 2a being disposed outermost as shown. Adjacent said multiple-stage sprocket wheel assembly, there is provided a change-over device for selecting any one of the sprocket wheels for engagement with the driving chain 3. As shown in FIGS. 2 and 3, a bracket 5 is adapted to be moved transversely by means of actuating Bowden wire 4. A spring 6 has a tendency to rotate a shaft 7 in one direction, and a frame 8 fixed to said shaft 7 carries a guide sprocket wheel 9 and tensioning sprocket wheel 10, around which sprocket wheels the lower run of the driving chain 3 passes along S-shaped path when the driving chain is running in the normal direction, as shown in FIG. 1. Such arrangement of the change-over device of the exposed speed change gear is old, and any further detailed explanation will not be necessary here.

In the bicycle equipped with the built-in coaster brake and the exposed speed change gear of the type above mentioned, according to the present invention, there is provided a device for maintaining the upper run of the driving chain 3 in tensioned condition upon rotation of the front sprocket 13 having pedal cranks 11 in the reverse direction for applying coaster brake. As shown in FIGS. 1, 4, 5 and 6, a bracket 15 is securely mounted to a seat tube 14 of the bicycle by means of a clamp 16. Said bracket 15 is extended rearwardly. A transverse pivot 17 is fixed to the bracket 15, and pivotally mounted thereon there are a relatively short depressing arm 18 and a relatively long supporting arm 19 extending rearwardly. As shown in FIGS. 1 and 4, one end of a coil spring 20 wound around the pivot 17 is in engagement with the depressing shorter arm 18, while the other end of the spring is in engagement with the supporting longer arm 19, the arrangement being such that the shorter arm 18 is biased to be quickly oscillated anti-clockwise in FIG. 1 and the longer arm 19 is biased to be oscillated clockwise. The free end of the shorter arm 18 carries a roller 21 adapted to engage with and depress the upper side of the upper run of the driving chain 3. Similarly, the free end of the longer arm 19 carries a second roller 22 adapted to engage with the lower side of the upper run of the driving chain and press the latter upwardly, as shown in FIG. 1. The roller 21 is disposed near the front sprocket 13.

In the position when the front sprocket 13 is rotating in the normal direction, the upper run of the driving chain is tensioned by being pulled forwardly, while the lower run of the driving chain is maintained in tensioned condition by being deformed into S-shaped path by means of the change-over lever device 8 as shown in FIG. 1. Now, when the front sprocket 13 is rotated in the reverse direction for the purpose of applying the coaster brake, the upper run of the driving chain tends to be slackened by being pulled rearwardly. At this time, the roller 21 on the depressing arm 18 will depress the upper run of the driving chain in the vicinity of the front sprocket 13, while the second roller 22 on the supporting arm 19 will be oscillated upwardly and support the remaining rear portion of the chain, thereby preventing hanging down thereof. Thus, the upper run of the driving chain 3 will take S-shaped path under tension around said rollers 21 and 22, as shown in FIG. 6. Upon restarting the rotation of the front sprocket 13 in the normal direction, the shorter arm 18 will be oscillated clockwise and the upper run of the driving chain 3 will be returned into its straight path as shown in FIG. 1. With respect to the rollers 21 and 22, it is preferable that each roller is provided with an outer tread 23 made of elastic material such as rubber for the purpose of minimizing any noise produced by frictional contact with the driving chain.

Figure 7:
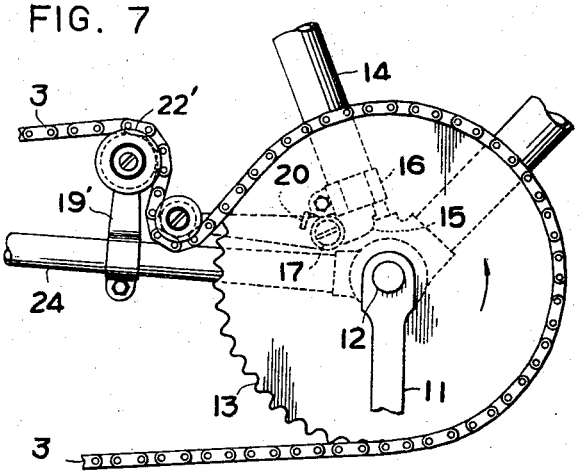
FIGURE 7 shows a modified form of the chain tensioning device, showing the parts in the position when the slackened upper run of the chain is tensioned according to the device of the present invention.
Figure 8:
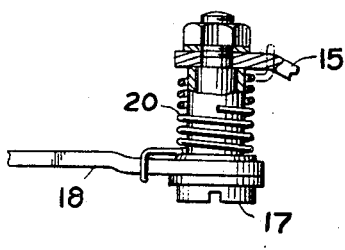
FIGURE 8 is a plan view of the depressing arm employed in the device of FIGURE 7.

In the above mentioned embodiment of the invention, it will be seen that the depressor arm 18 and the supporting arm 19 are under the control of the spring 20 which is in common with both arms, and that the depressor arm 18 is more important in tensioning the upper run of the driving chain at the time of applying coaster brake. In view of this, it would be not always necessary that the supporting arm 19 acts in co-operation with said depressor arm 18, and if desired said supporting arm 19 may be arranged inmovably. In the modified form of the device shown in FIG. 7, a support arm 19' carrying a roller 22' at its free end is securely mounted to a chain stay 24 of the bicycle. On the other hand, the depressor arm 18 is pivotally mounted on the axis 17 of the bracket 15, and biased by a spring 20 which serves for sole purpose of quickly oscillating the arm 18 downwardly in case of applying the coaster brake by rotating the front sprocket in the reverse direction.

From the foregoing, it will be understood according to the present invention that a new device is provided for quickly depressing the upper run of the driving chain upon loosening tension thereof at the time of applying coaster brake by rotating the front sprocket in the reverse direction and for supporting the upper run of the chain at the nearest rear position, so that the upper run of the driving chain is at said position maintained in firm engagement with the front sprocket teeth under desired tension.

What we claim is:

1. In a bicycle, the combination of a rear hub with built-in coaster brake and an exposed speed change gear consisting of a plurality of sprocket wheels of different numbers of teeth adapted for selective engagement with a driving chain, a device for tensioning the upper run of the driving chain upon applying the coaster brake, comprising a front sprocket having pedal cranks, a chain depressor arm pivotally mounted to a stay tube of the bicycle and having a roller adapted to depress the upper run of the driving chain at the position behind the front sprocket upon the rotation of the front sprocket in the reverse direction for applying the coaster brake, and a supporting arm adapted for supporting the upper run of the driving chain from the under side thereof at the position rear to and in the vicinity of said chain depressor arm.

2. The combination as recited in claim 1, wherein said depressor arm is rotatable clockwise while said chain supporting arm is rotatable anti-clockwise, as biased by a coil spring wound around common pivot of said arms.

3. The combination as recited in claim 1, wherein said chain depressor arm is rotatable, while said chain supporting arm is stationary.

4. The combination as recited in claim 1, wherein each roller on the free end of said chain depressor arm and chain supporting arm is provided with a tread made of elastic material.

References Cited

UNITED STATES PATENTS

| 96,718 | 11/1869 | Meriam | 74—242.1 XR |
| 175,676 | 4/1876 | Doane et al. | 74—242.1 XR |
| 2,718,108 | 9/1955 | Schmidt | 74—242.8 XR |

FOREIGN PATENTS

| 420,128 | 11/1934 | Great Britain. |
| 598,430 | 2/1948 | Great Britain. |

FRED C. MATTERN, JR., *Primary Examiner.*

J. A. WONG, *Assistant Examiner.*